United States Patent [19]

Nishimura et al.

[11] Patent Number: 5,623,379
[45] Date of Patent: Apr. 22, 1997

[54] METHOD OF CONTROLLING A START-UP OF A MOTOR USED FOR A DISK APPARATUS

[75] Inventors: Kazuo Nishimura; Tatsuro Sasamoto, both of Kawasaki, Japan

[73] Assignee: Fujitsu Limited, Kawasaki, Japan

[21] Appl. No.: 384,959

[22] Filed: Feb. 7, 1995

[30] Foreign Application Priority Data

Feb. 14, 1994 [JP] Japan .................................. 6-017549

[51] Int. Cl.$^6$ ...................................................... G11B 15/48
[52] U.S. Cl. ...................... 360/74.1; 360/73.03; 324/226; 73/862.193; 318/254
[58] Field of Search .............................. 360/73.03, 74.1, 360/71, 73.01, 98.07, 99.08, 31; 369/58; 324/212, 226; 73/862.193; 318/254, 439, 138

[56] References Cited

U.S. PATENT DOCUMENTS

| | | | |
|---|---|---|---|
| 3,137,163 | 6/1964 | Engelmann | 73/862.193 |
| 4,458,273 | 7/1984 | Johnson | 360/74.1 |
| 4,809,248 | 2/1989 | Sengoku | 360/73.03 |
| 4,816,937 | 3/1989 | Fukushima | 360/73.03 |
| 4,839,754 | 6/1989 | Gami | 360/73.01 |
| 4,970,610 | 11/1990 | Knappe | 360/73.03 |
| 5,117,165 | 5/1992 | Cassat | 318/254 |
| 5,235,264 | 8/1993 | Kaneda | 360/73.03 |
| 5,350,984 | 9/1994 | Carobolante | 318/254 |
| 5,397,971 | 3/1995 | McAllister | 360/73.03 |
| 5,412,809 | 5/1995 | Tam | 360/73.03 |
| 5,471,353 | 11/1995 | Codilian | 360/73.03 |
| 5,493,188 | 2/1996 | Yoshikawa | 318/254 |

FOREIGN PATENT DOCUMENTS

| | | | |
|---|---|---|---|
| 55-93033 | 7/1980 | Japan | 73/862.193 |
| 239461 | 10/1986 | Japan | 360/73.03 |
| 63-14374 | 1/1988 | Japan | 360/73.03 |
| 4-109891 | 4/1992 | Japan . | |
| 4-109892 | 4/1992 | Japan . | |
| 5-290500 | 11/1993 | Japan . | |
| 6-44678 | 2/1994 | Japan . | |

OTHER PUBLICATIONS

"Disk File Soft Starting (Controlled Initial Acceleration)" Research Disclosure, Nov., 1984, No. 247 Kenneth Mason Publications Ltd, England.

*Primary Examiner*—Aristotelis Psitos
*Assistant Examiner*—Alan Faber
*Attorney, Agent, or Firm*—Greer, Burns & Crain, Ltd.

[57] ABSTRACT

A method of controlling start-up of a sensorless spindle motor used in a disk apparatus reduces time spent on start-up of a spindle motor with high reliability. The motor is used for rotating a disk on which information is recorded, and no sensor is provided in the motor for sensing an angular position of a rotor relative to a stator of the motor. The motor is operated at a steady rotational speed and is stopped by supplying a stop command. An aligning operation is performed immediately after the motor is stopped. The aligning operation is performed to rotate the rotor to a predetermined angular position relative to the stator of said motor. The motor is operated at a steady speed by a synchronization control when operation of the motor is started by supplying a start command.

6 Claims, 10 Drawing Sheets

METHOD OF CONTROLLING A START-UP OF A MOTOR USED FOR A DISK APPARATUS

BACKGROUND OF THE INVENTION

1. Field of the Invention

The present invention generally relates to a method of controlling a start-up of a motor, and more particularly to a method of controlling a start-up of a motor used for rotating a disk installed in a disk apparatus, which motor does not have an angular position sensor.

2. Description of the Related Art

In recent years, sensorless motors have been used for magnetic disk apparatuses used as an external memory apparatus because of the requirements for large capacity, high speed processing, low price and small size, the sensorless motors being used for driving a spindle for a magnetic disk. These magnetic disk apparatuses may have a standby mode function by which rotation of the sensorless motor is temporarily stopped when an access command is not input for a predetermined period of time so as to cut off unnecessary power consumption by the sensorless motor so that a low power consumption is achieved.

Accordingly, when the access command is input, the sensorless motor must be started up, first, to reach a steady rotational speed, and thus it is required to reduce the period of the start-up time of the sensorless motor.

A description will now be given, with reference to FIG. 1, of a conventional magnetic disk apparatus. FIG. 1 is a plan view of a conventional magnetic disk apparatus 11.

As shown in FIG. 1, the magnetic disk apparatus 11 comprises an actuator 12 having an arm 13 on one end of which is provided a magnetic head 14 via a support spring 13a. A base part of the arm 13 is rotatably supported by a pivot 15.

At the other end of the arm 13 relative to the pivot 15 a rotational support portion provided with a coil 17 is formed. Two magnets 18a and 18b are situated under the coil 17. The coil 17 and the magnets 18a and 18b constitute a voice coil motor (VCM).

The arm 13 of the actuator 12 rotates about the pivot 15 when an electric current is supplied to the coil 17 from a printed circuit board 21 via a flexible printed circuit board 22. Accordingly, the magnetic head 14 is moved along a radial direction of a magnetic disk 20 attached to a spindle 19 which is rotated by a sensorless-type spindle motor (not shown in the figure). When the magnetic disk 20 is rotating, the magnetic head 14 floats on the magnetic disk 20 due to an air flow generated by the rotation of the magnetic disk 20.

It should be noted that the sensorless-type motor is used for rotating the magnetic disk 20 because it is difficult to reserve a space to provide a sensor due to the requirement for a small and thin apparatus.

Additionally, a controlling circuit board (not shown in the figure) is provided which comprises a central processing unit (CPU), a micro processor unit (MPU), a read/write controlling unit, a head positioning unit and a spindle motor controlling unit.

FIG. 2 shows a side view of a portable personal computer 23 in which the magnetic disk apparatus shown in FIG. 1 is used. The portable personal computer 23 comprises a main body 24 having an operational unit 24a and a lid 25 having a display unit 25a. The above-mentioned magnetic disk apparatus 11 is inserted into the main body 24 from a side thereof. In this state, a host computer in the main body 24 is connected to the CPU in the magnetic disk apparatus 11 via a SCSI interface so that commands and data are transmitted therebetween.

Additionally, in apparatuses like the above-mentioned portable personal computer 23, it is common to have a battery for a power source, and thus to have a function for reducing power consumption. More specifically, an operation of the spindle motor of the magnetic disk apparatus 11 is stopped when an access request is not sent from the host computer for a predetermined period of time in a state where the magnetic disk apparatus 11 is not operated. The spindle motor is started when the access request is received.

FIG. 3 is a flow chart of a start-up operation of the spindle motor from a standby mode. First, a spin-on command is sent, in step 51 (hereinafter step is abbreviated as ST), to the spindle motor controlling unit from the MPU when an access request is sent to the CPU of the magnetic disk apparatus 11 from the host computer. An aligning operation of a stator and a rotor of the spindle motor is then performed in ST52. These steps normally take 2 to 3 seconds.

The aligning operation is performed for supply an electric current to a predetermined phase of the spindle motor so as to fix the position of the rotor relative to the stator. This aligning operation is necessary for the sensorless-type spindle motor which does not have a sensor to detect an angular position of the rotor.

Thereafter, a synchronization control is performed, in ST53, to forcively apply a rotating magnetic field until a rotational speed of the spindle motor reaches a speed at which a back electromotive force (BEMF) can be detected. A BEMF signal is then detected, in ST54, by a BEMF detection control, and the spindle motor is operated, in ST55, at a predetermined steady rotational speed by applying power to a correct phase.

On the other hand, when the spindle motor is not operated, the magnetic head 14 is in contact with the magnetic disk 20. If this condition continues for a long period of time, the magnetic head adheres to the magnetic disk 20. In order to eliminate this problem, a measurement is taken at a delivery stage for an adhesion torque under a predetermined condition. For example, a relationship between an applied voltage and a torque is obtained beforehand, and the adhesion torque is measured by gradually increasing the voltage applied to the spindle motor.

However, in the case where the spindle motor is started up from the standby mode as mentioned above, the aligning operation is needed as an angular position of the rotor is not fixed. Accordingly there is a problem in that time must be spent on the alignment operation before the rotational speed of the spindle motor reaches a steady speed from the time a start-up command is received. This is a common problem with inventions described in Japanese Laid-Open Patent Applications No. 4-109891 and No. 4-109892 in which a reduction of a start-up time until the rotational speed becomes steady is disclosed.

Additionally, as described in Japanese Laid-Open Patent Application No. 5-290500, it is known to reduce the start-up time by means of a detection of an angular position of the spindle motor in accordance with information recorded on a predetermined position of the magnetic disk attached to the spindle. However, there is a problem in that the recorded information on the magnetic disk may be lost for some reason, and thus reliability is not ensured.

There is another problem in that when the adhesion torque is measured, in a case where the aligning operation of the spindle motor is performed, there is a possibility that the spindle motor will rotate in a reversed direction, and thus an accurate measurement cannot be performed.

SUMMARY OF THE INVENTION

It is a general object of the present invention to provide a novel and useful method of controlling a start-up of a spindle motor used in a disk apparatus, in which method the above-mentioned problems are eliminated.

A more specific object of the present invention is to provide a method of controlling a start-up of a spindle motor used in a disk apparatus, in which method time spent on a start-up of a spindle motor is reduced with high reliability.

Another object of the present invention is to provide a method of controlling a start-up of a spindle motor used in a disk apparatus, in which method an adhesion torque is accurately measured.

In order to achieve the above-mentioned objects, there is provided according to one aspect of the present invention, a method of controlling a start-up of a motor used in a disk apparatus, the motor being used for rotating a disk on which information is recorded, no sensor being provided in the motor for sensing an angular position of a rotor relative to a stator of the motor, the method comprising the steps of:

a) stopping the motor being operated at a steady rotational speed by supplying a stop command;

b) performing an aligning operation immediately after the motor is stopped, the aligning operation being performed to rotate the rotor to a predetermined angular position relative to the stator of said motor; and c) operating the motor at a steady speed by a synchronization control when an operation of the motor is started by supplying a start command.

According to the above-mentioned invention, since the aligning operation is performed when the operation of the motor is stopped instead of being performed when the motor is started, the start-up time of the motor is reduced without needing to detect the angular position of the rotor of the motor. Therefore, the disk apparatus according to the present invention can be started up in a short time.

Additionally, there is provided according to another aspect of the present invention, a method of controlling a start-up of a motor when an adhesion torque is measured, the motor being used for rotating a disk on which information is recorded, a head being provided in the disk apparatus for recording/reproducing the information to/from the magnetic disk, the start-up torque being increased by the adhesion torque generated due to an adhesion of the head to the disk, the method comprising the steps of:

m) stopping the motor being operated by supplying a stop command so that the head is in contact with said disk;

n) performing an aligning operation immediately after the motor is stopped, the aligning operation being performed for rotating a rotor of the rotor to a predetermined angular position relative to a stator of the motor;

p) applying stepwise a voltage to the motor until the motor starts to rotate; and q) determining the adhesion torque in accordance with a relationship between a voltage supplied to the motor and the start-up torque obtained beforehand.

According to the above-mentioned invention, since the aligning operation has been performed before the operation for measuring the adhesion torque by supplying voltage to the motor, the motor never rotates in a reverse direction as is in the prior art, and thus an exact adhesion torque can be measured.

Other objects, features and advantages of the present invention will become more apparent from the following detailed descriptions when read in conjunction with the accompanying drawings.

DETAILED DESCRIPTION OF THE PREFERRED EMBODIMENT

Figure 4:
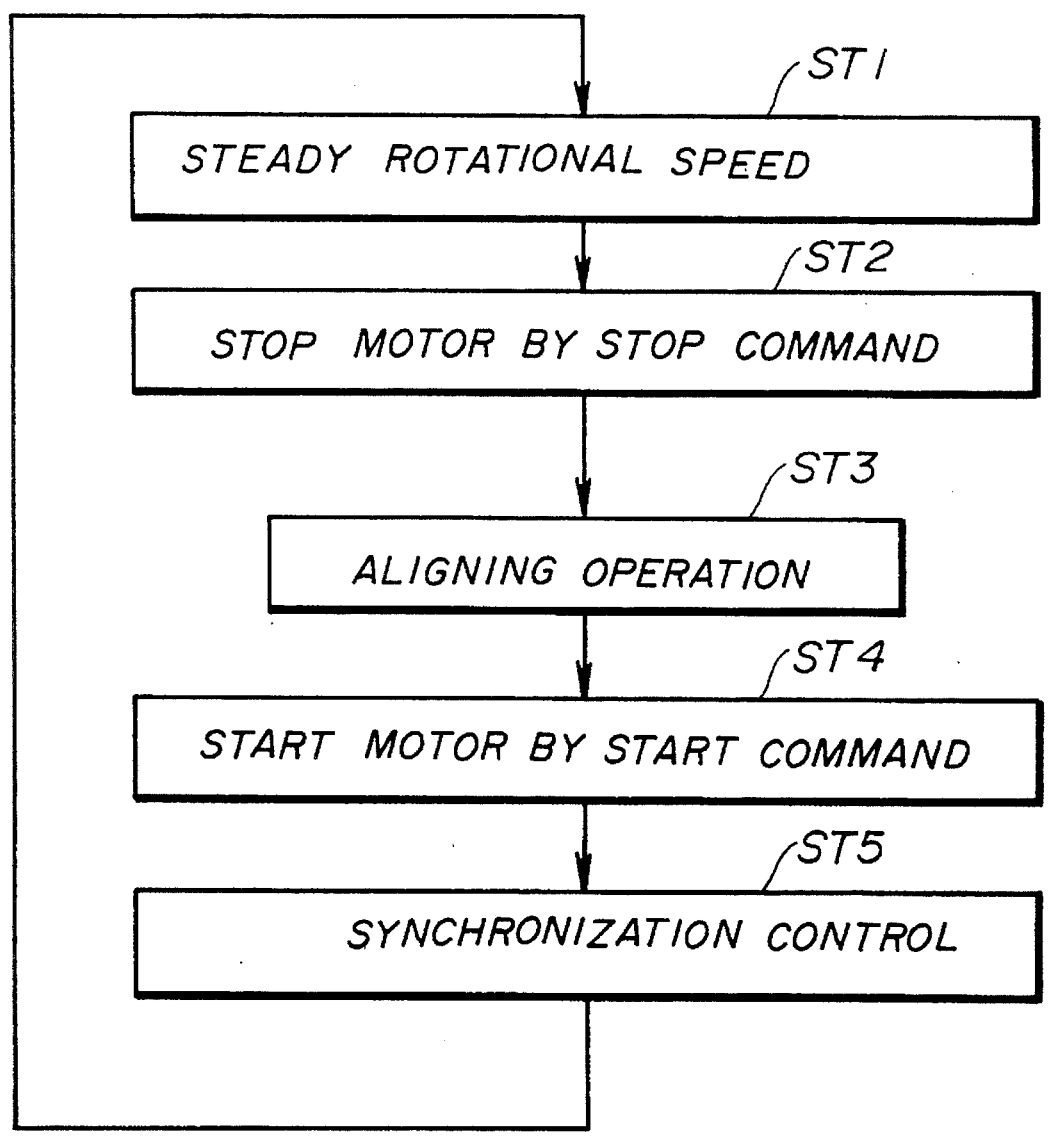
FIG. 4 is a flow chart of a start-up operation of a spindle motor performed based on a method according to the present invention.

A description will now be given, with reference to FIG. 4, of a principle of a method according to the present invention. The method according to the present invention is directed to the control of a start-up of a spindle motor used for rotating a disk-like recording medium. The spindle motor is a type which does not have a sensor to detect an angular position of a rotor. The spindle motor is operated, in ST1, at a steady rotational speed. The spindle motor is stopped, in ST2, in accordance with a stop command. After the spindle motor is stopped, an aligning operation is performed, in ST3, to fix an angular position of the rotor with respect to the stator of the spindle motor. The spindle motor is started, in ST4, in accordance with a start command, and then the spindle motor is operated, in ST5, at a steady rotational speed by a synchronization control.

Figure 1:
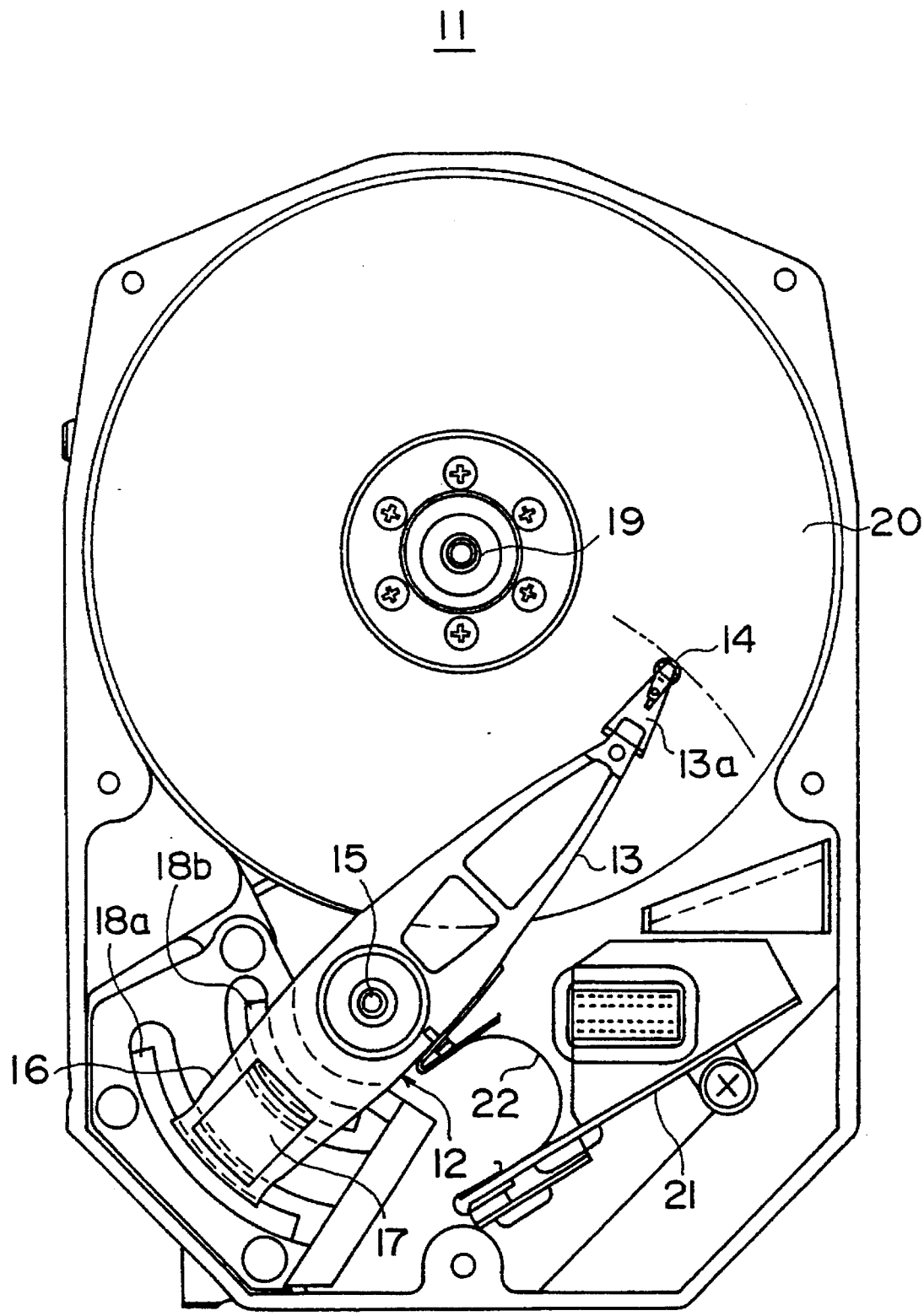
FIG. 1 is a plan view of a conventional magnetic disk apparatus.
Figure 2:
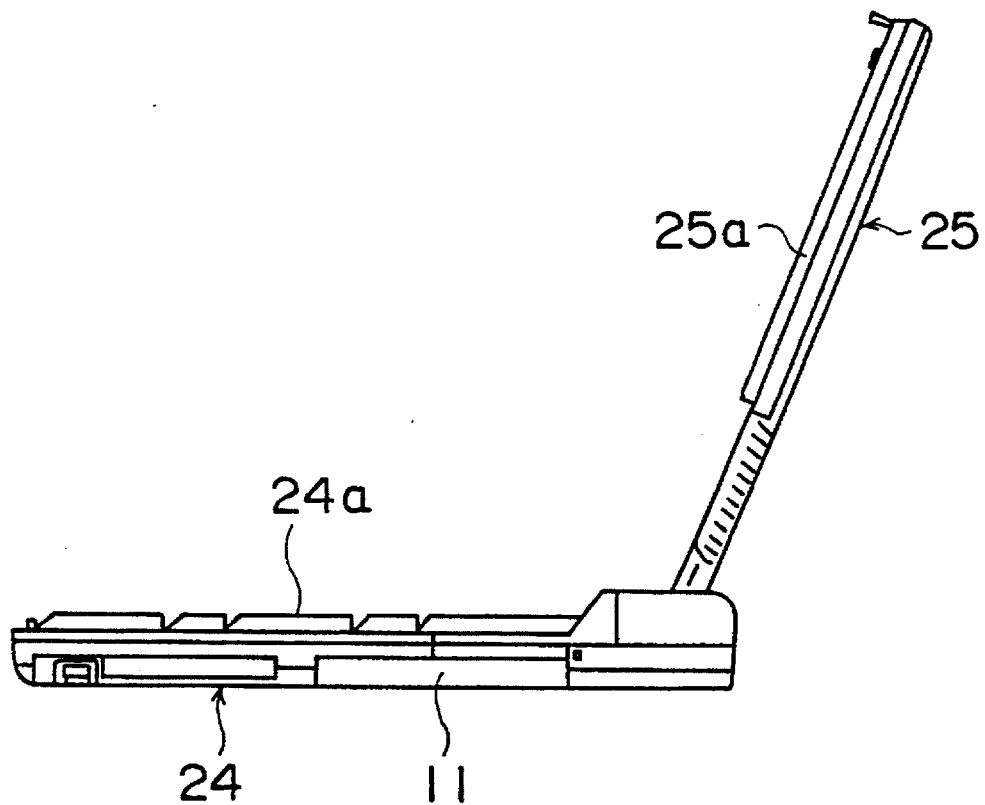
FIG. 2 is a side view of a computer in which the magnetic disk apparatus shown in FIG. 1 is used.
Figure 3:
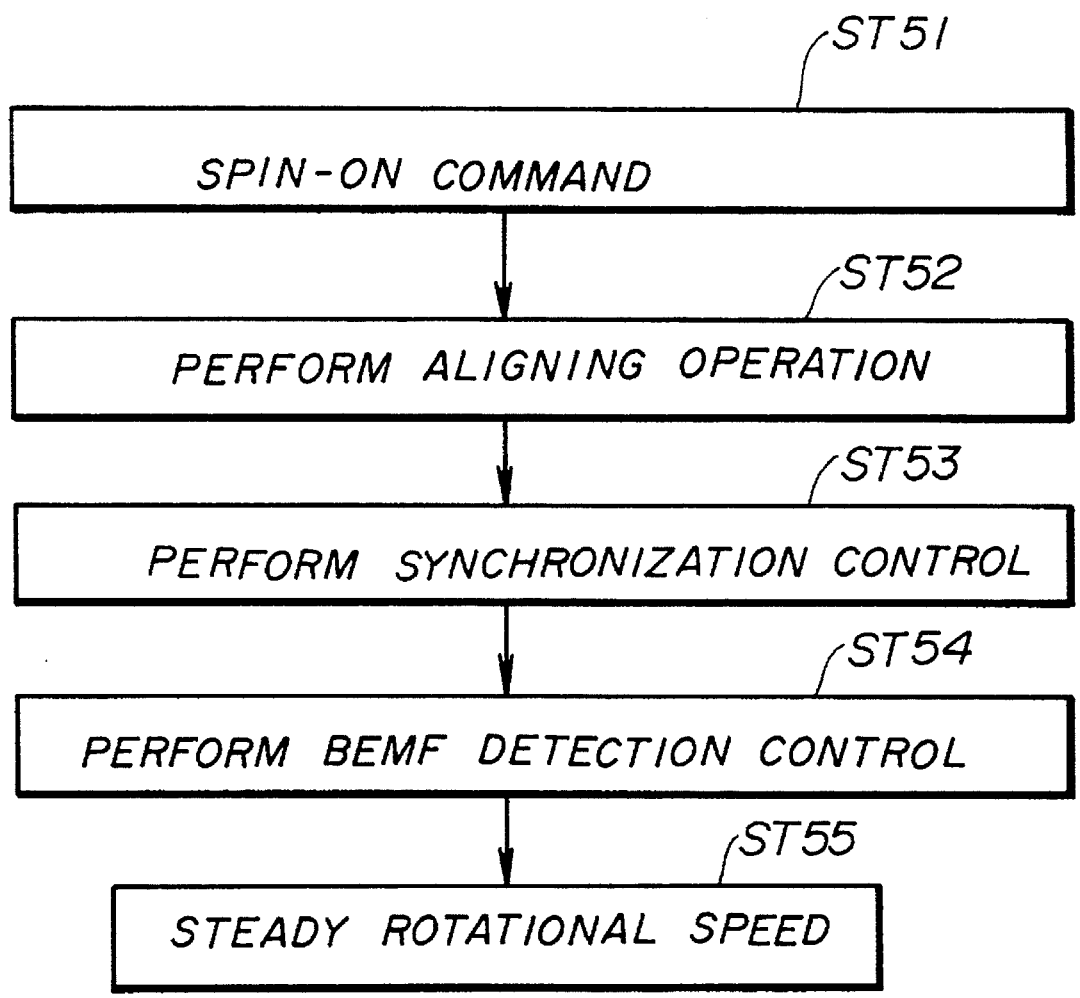
FIG. 3 is a flow chart of a start-up operation of a spindle motor from a standby mode.
Figure 5:
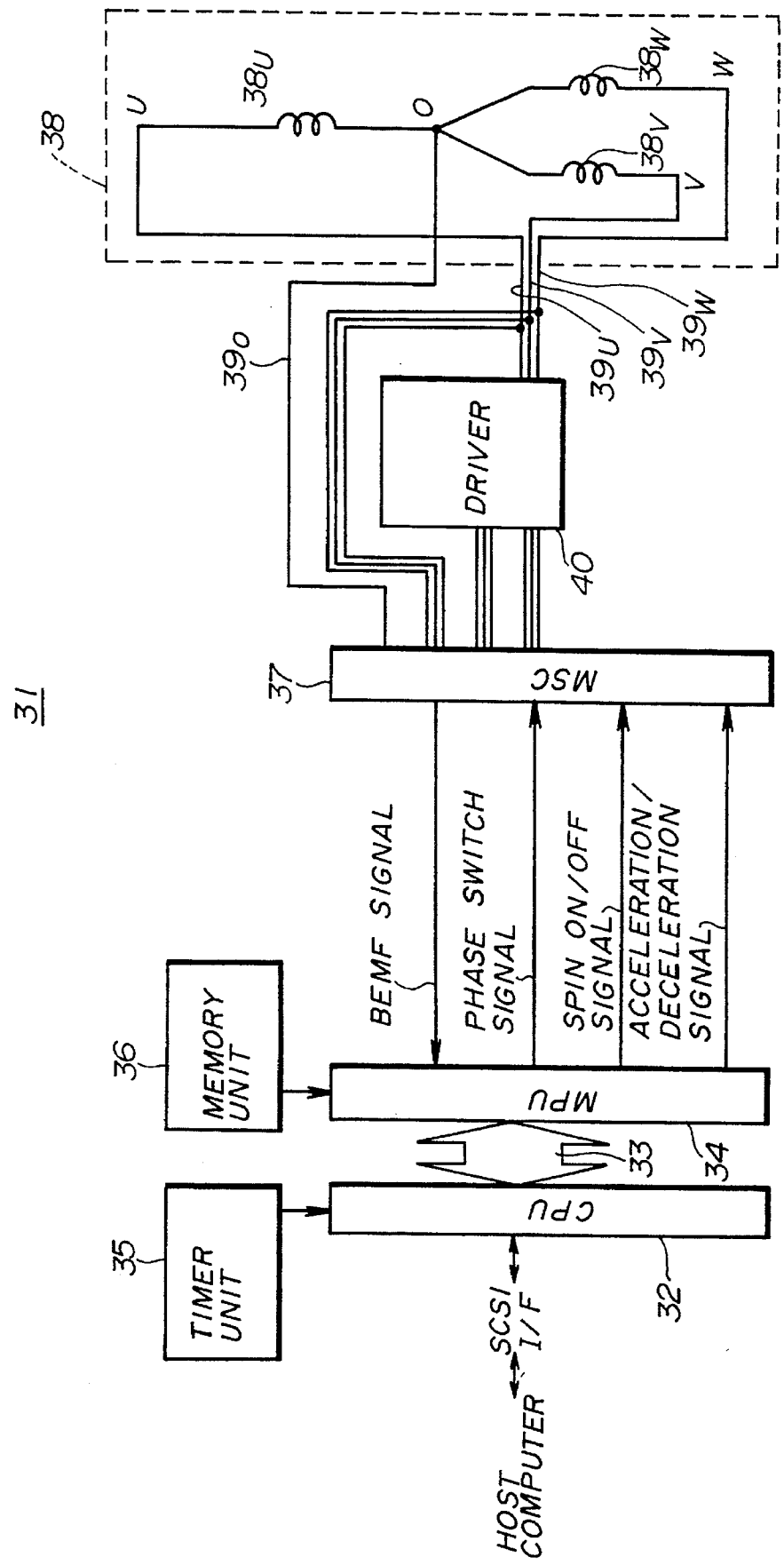
FIG. 5 is a block diagram of an essential part of a magnetic disk apparatus performing a method according to the present invention.

FIG. 5 is a block diagram of an essential part of a magnetic disk apparatus 31 performing the method according to the present invention. Parts of the magnetic disk apparatus other than the parts shown in FIG. 5 are the same as those shown in FIGS. 1 and 2.

As shown in FIG. 5, the magnetic disk apparatus 31 comprises a CPU 32 and an MPU 34 connected to the CPU 32 via a bus 33. The CPU 32 is connected to a host computer via a small computer systems interface (SCSI I/F). A timer unit 35 is also connected to the CPU 32. A memory unit 36 functioning as memory means is connected to the MPU 34, which memory unit comprises a non-volatile memory such as a flash memory or an EPROM. After an aligning operation (described later) is performed, a flag is provided in the memory unit 36, which condition indicates that the aligning operation has been performed.

The CPU 32 analyzes commands received from the host computer, and supplies the commands to the MPU 34. Additionally, the CPU 32 determines a standby mode in which a spindle motor (described later) is stopped when a count value, which is counted by the timer unit 35 while no access request is being supplied from the host computer, reaches a predetermined value (predetermined period).

The MPU 34 sends to a motor speed controller (MSC) 37 an on/off command for the spindle motor. The MPU 34 also instructs the MSC 37 to accelerate or decelerate the spindle motor by measuring a period of a BEMF signal sent from the spindle motor. It should be noted that the MPU 34 has a timer function for measuring a time during which the BEMF signal is not output.

The magnetic disk serving as a recording medium is rotated by being attached on a spindle of a sensorless-type spindle motor 38 which does not have a sensor to detect a angular position of a rotor. In this embodiment, a three-phase DC brushless motor is used. The spindle motor 38 comprises a rotor and a stator having an U-phase coil $38_U$, a V-phase coil $38_V$ and a W-phase coil $38_W$. Accordingly, an U-phase line $39_U$, a V-phase line $39_V$, a W-phase line $39_W$ and a neutral line $39_O$ extend from the spindle motor 38. The MPU 34 controls power supply to these phase coils.

The MSC 37 instructs a driver 40 to vary an intensity of a current supplied to each of the coils $38_U$, $38_V$ and $38_W$ in accordance with an acceleration/deceleration signal supplied by the MPU 34. The MSC 37 also generates the BEMF signals from a back electromotive force of each of the coils $38_U$, $38_V$ and $38_W$ and a neutral potential of the neutral line $39_O$, and send them to the MPU 34.

The driver 40, for example one comprising power transistors, supplies current pulses to each of the phase coils, which current pulses are in synchronization with synchronization pulses.

Figure 6:
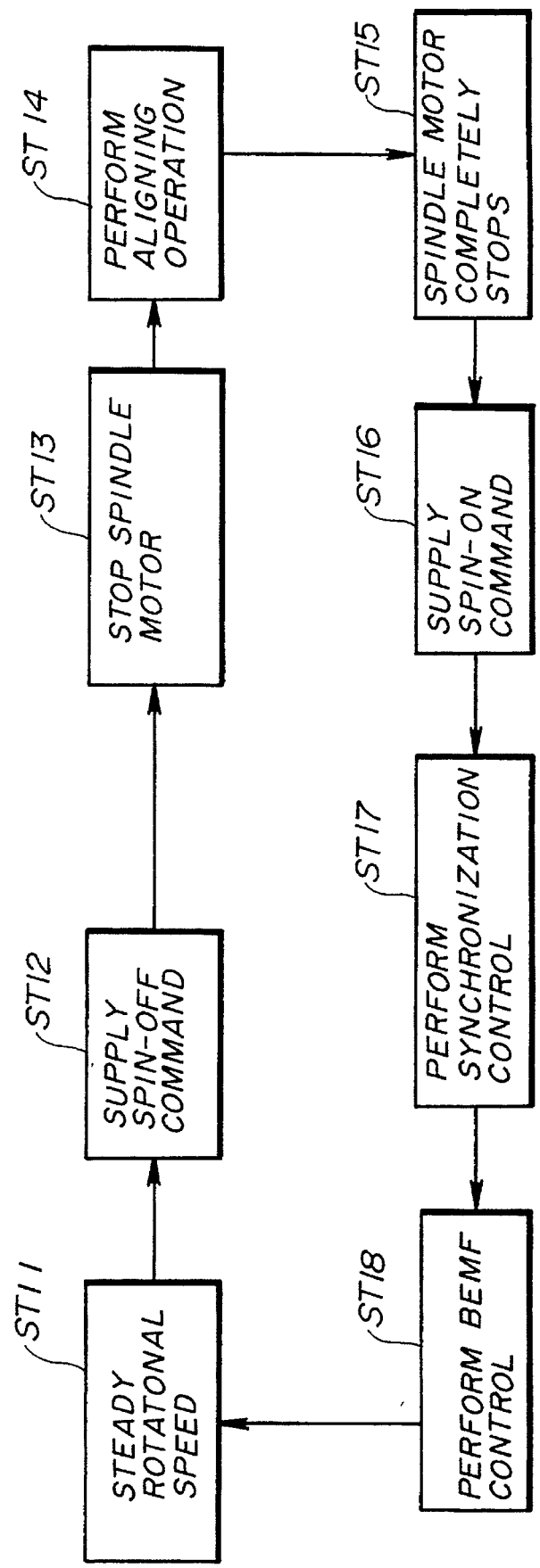
FIG. 6 is a flow chart of an operation of the magnetic disk apparatus shown in FIG. 5.

FIG. 6 shows a flow chart of an operation of the spindle motor 38 shown in FIG. 5.

In FIG. 6, the spindle motor 38 is operated, in ST11, at a steady rotational speed. When a spin-off command is supplied, in ST12, from the MPU 34 to the MSC 37, the rotation of the spindle motor 38 is stopped in ST13. After the spindle motor 38 is stopped, an aligning operation is performed in ST14, and then the spindle motor 38 is determined to be completely stopped, in ST15, and the magnetic disk apparatus 31 is set to a standby mode. At this time, a flag representing that the alignment operation has been performed is stored in the memory unit 36.

Thereafter, when a spin-on command is supplied, in ST16, from the MPU 34 to the MSC 37, operation of the spindle motor 38 is started under a synchronization control performed in ST17, and then a BEFM control is performed, in ST18, by means of a detected BEMF signal. The spindle motor 38 is then operated at a steady rotational speed. As mentioned above, in this embodiment, the aligning operation of the spindle motor 38 is performed not when the spindle motor 38 is started but when the spindle motor 38 is stopped.

Figure 7:
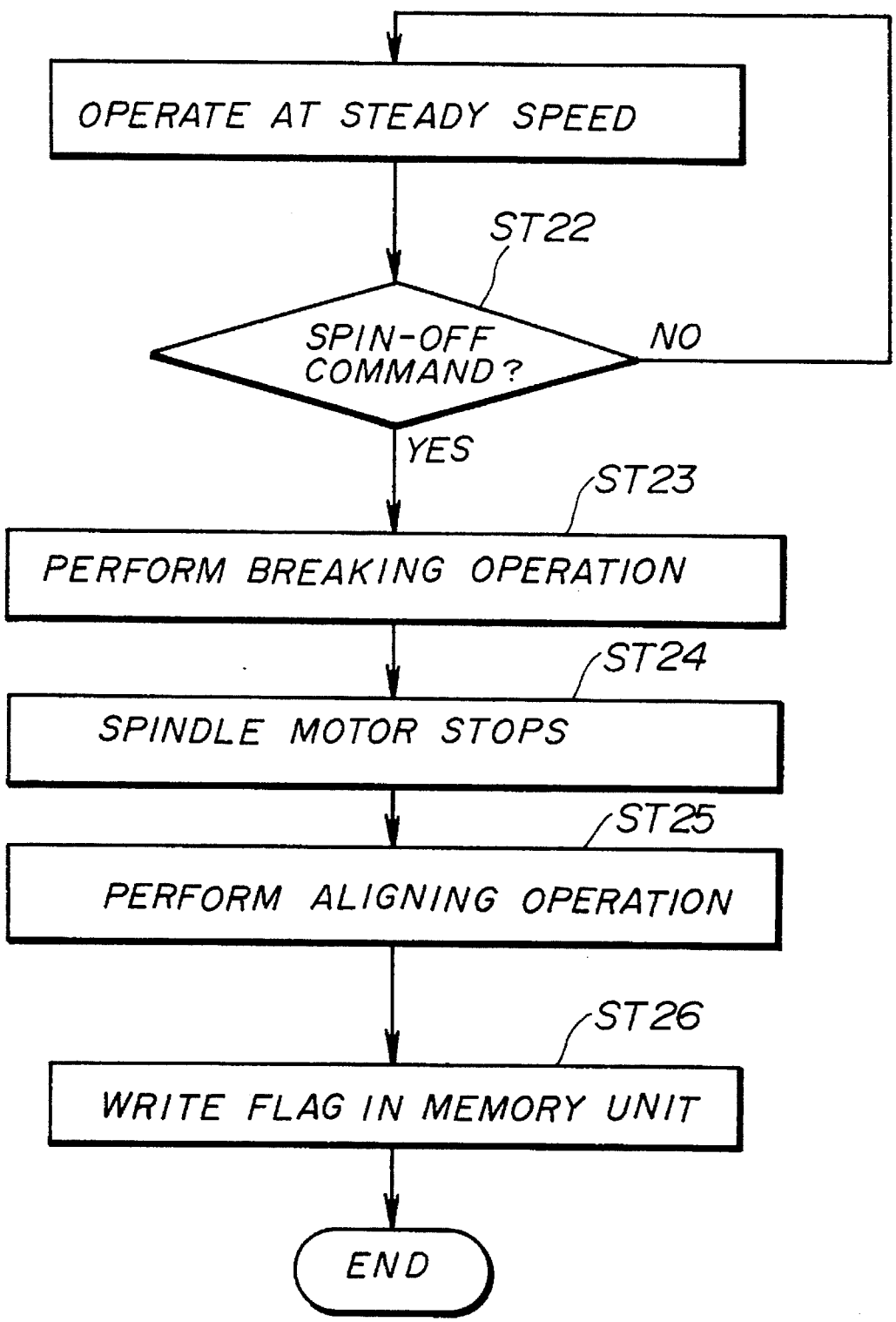
FIG. 7 is a flow chart of an operation of the spindle motor shown in FIG. 5 when an operation of the spindle motor is stopped.

A detailed description will now be given, with reference to FIG. 7, of the stop operation of the spindle motor 38. FIG. 7 shows a flow chart of the operation of the spindle motor when it is stopped.

In FIG. 7, the spindle motor 38 is operated, in ST21, at a steady rotational speed. The spindle motor 38 continues to rotate until the spindle command is supplied. The timer unit 35 counts up from the time the last access request was supplied by the host computer. When the count value of the timer unit 35 reaches a predetermined value, which condition indicates that a predetermined period has elapsed, the CPU 32 sets the MPU 34 in the standby mode, and then the CPU 32 supplies the spin-off command to the MPU 34.

It is determined, in ST22, whether or not the spin-off command is supplied from the CPU 32 to the MPU34. If it is determined that the spin-off command is supplied, the MPU 34 supplies the spin-off command to the MSC 37, and then supplies, in ST23, a deceleration signal to the MSC 37 so as to perform a breaking operation. The MPU 34 determines, in ST24, that the spindle motor 38 is stopped when a predetermined time has elapsed since the time that the BEMF signal was not detected due to a reduction in the rotational speed of the spindle motor 38. The aligning operation is then performed in ST25.

In the aligning operation, the MPU 34 selects specific phases, for example U-phase and V-phase, by means of a phase switching signal and sends an acceleration signal and the spin-on command to the MSC 37. The aligning operation is completed when another spin-off command and another deceleration signal are supplied to the MSC 37 after a predetermined time has elapsed.

After the aligning operation is completed, a flag indicating that the aligning operation has been performed is written, in ST26, in the memory unit 36, and then the routine is ended when the CPU 32 is notified that the operation corresponding to the spin-off command has been completed.

Figure 8:
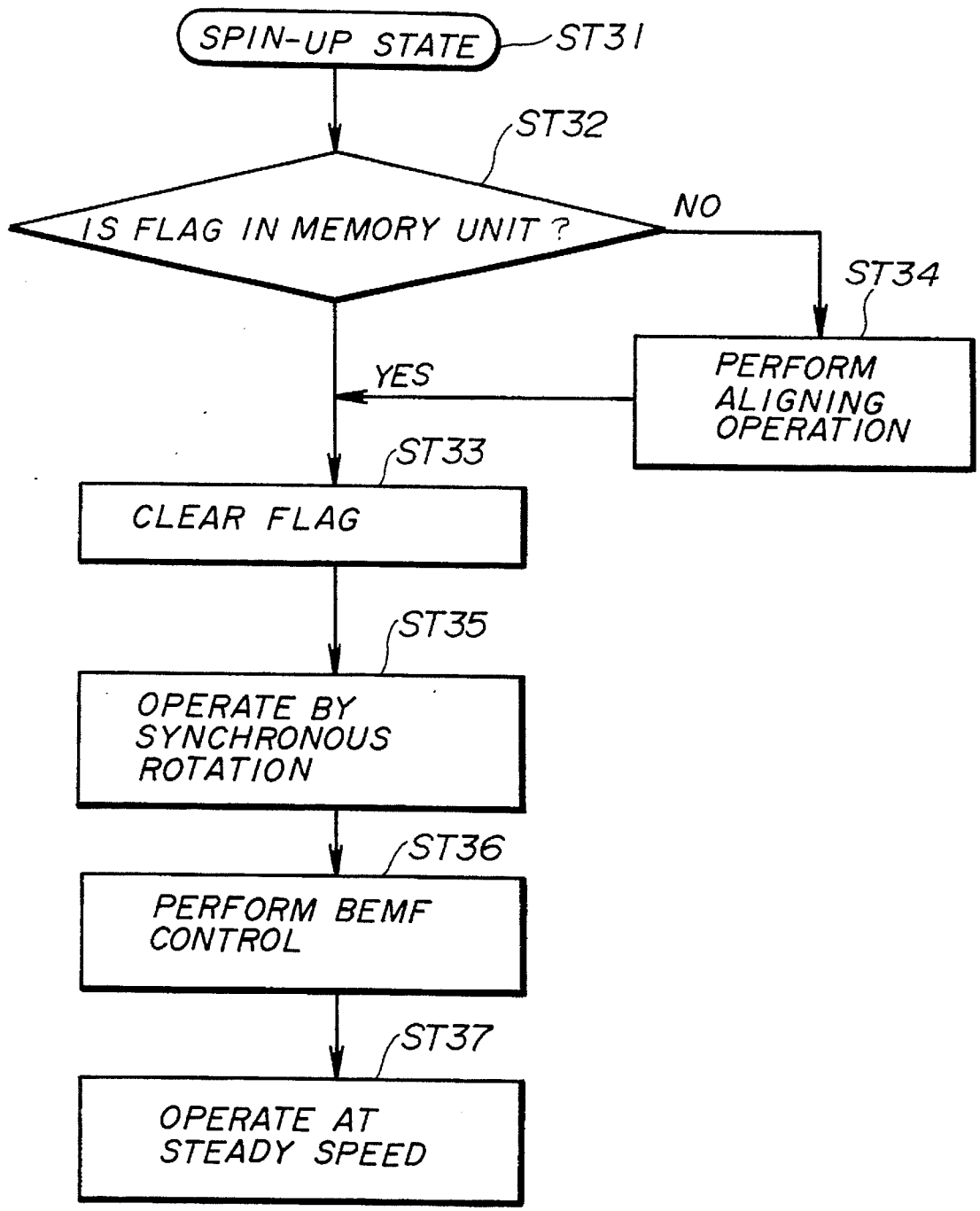
FIG. 8 is a flow chart of an operation of the spindle motor shown in FIG. 5 when an operation of the spindle motor is started.

A description will now be given, with reference to FIG. 8, of a start-up operation of the spindle motor 38. FIG. 8 is a flow chart of the start-up operation of the spindle motor 38 shown in FIG. 5.

In FIG. 8, when the spin-on command is supplied from the CPU 32 to the MPU34 due to an access request from the host computer, the MPU 34 is set, in ST31, in a spin-up state in which it is determined, in ST32, whether or not the flag indicating that the aligning operation has been performed is written in the memory unit 36. If it is determined that the flag is written in the memory unit 36, which condition indicates that the aligning operation has been performed, the flag is cleared in ST33. If it is determined that the flag is not written in the memory unit 36, the routine proceeds to ST34 where the aligning operation is performed, and then the routine proceeds to ST33.

That is, when the spindle motor is stopped for an unexpected reason such as a power failure, the aligning operation is performed at the time the operation of the spindle motor 38 is started. Otherwise, the aligning operation is not performed at the time the operation of the spindle motor is started.

After the flag is cleared, the spindle motor 38 is operated, in ST35, to perform a synchronous rotation as the MPU 34 supplies the spin-on command and the acceleration signal to the MSC 37. During the synchronous rotation, the spindle motor 38 is operated by means of generating a rotating magnetic field by switching the phase switching signal until the BEMF signal is output by the MSC 37 due to an increase in rotational speed of the spindle motor 38, and the BEMF control is performed in ST36.

When the rotational speed of the spindle motor reaches a speed at which the BEMF signal is generated and output to the MPU 34, the MPU 34 switches, in ST37, the phase until it reaches a steady rotational speed, and switches the acceleration signal and the deceleration signal to maintain the steady rotational speed.

Figure 9:
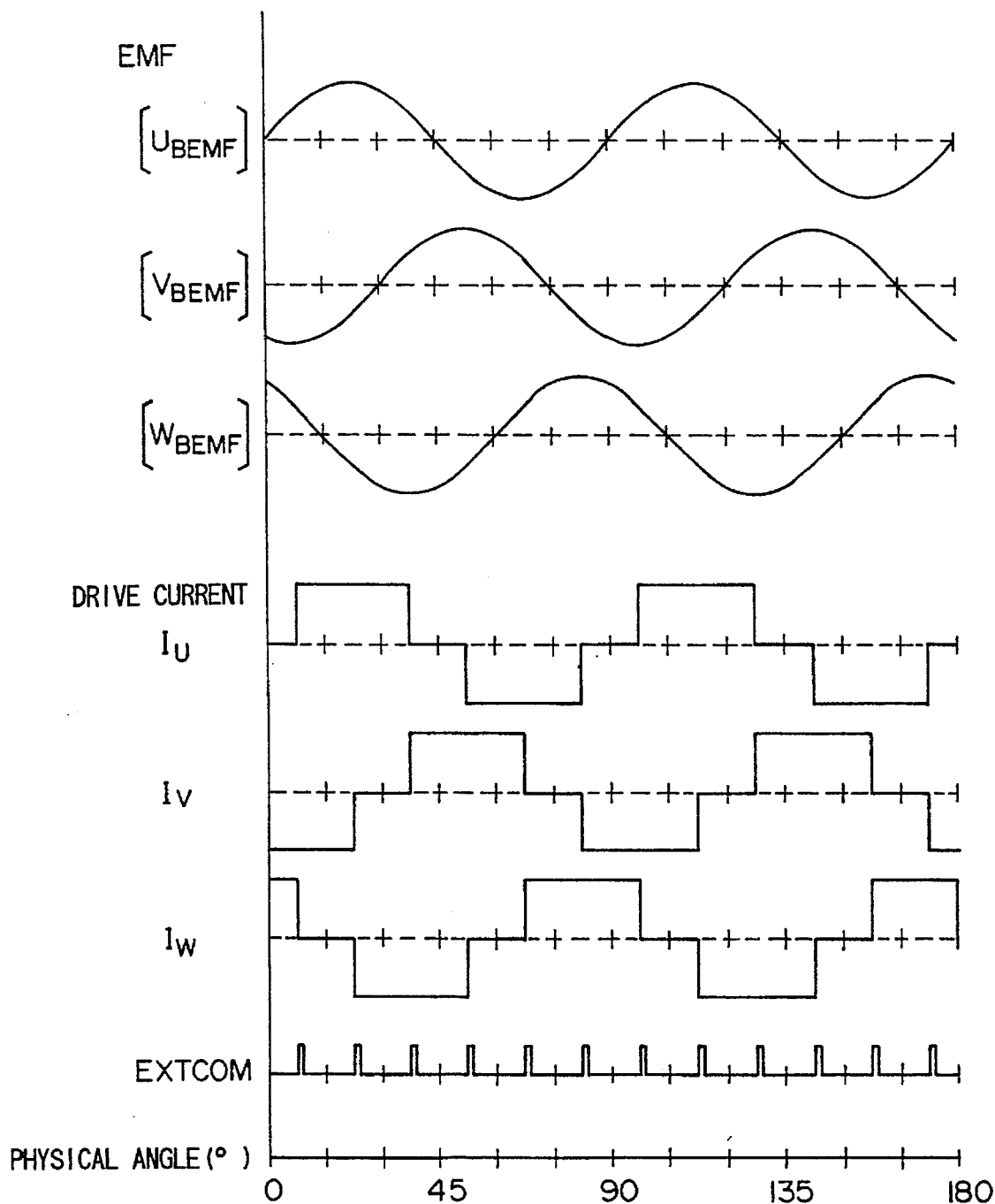
FIG. 9 is a timing chart of a synchronous rotation of the spindle motor shown in FIG. 5.

A timing chart of the synchronous rotation of the spindle motor 38 is shown in FIG. 9. As shown in FIG. 9, driving currents $I_U$, $I_V$ and $I_W$ are supplied to the U-phase coil $38_U$, the V-phase coil $38_V$ and the W-phase coil $38_W$, respectively. The phases of these driving currents are changed in synchronization with a synchronization pulse signal (EXT-COM) which is pulsed at every predetermined physical angle. When the spindle motor 38 is operated by the synchronous rotation, a back electromotive force $U_{BEMF}$ having a sinusoidal waveform is detected by the MSC 37 at the U-phase line $39_U$; a back electromotive force $V_{BEMF}$ having a sinusoidal waveform is detected at the V-phase line $39_V$; a back electromotive force $W_{BEMF}$ having a sinusoidal waveform is detected at the W-phase line $39_W$. These back electromotive forces have different phases.

In the present embodiment, since the aligning operation is performed when the operation of the spindle motor 38 is stopped instead of being performed when the motor is started, the start-up time of the spindle motor 38, from the standby mode to when the steady rotational speed is reached, is reduced without needing to detect the angular position of the spindle motor 38. Additionally, in a case where the aligning operation has not been performed when the operation of the spindle motor 38 is stopped, the aligning operation is performed when the operation of the spindle motor 38 is started. Therefore, the magnetic disk apparatus according to the present embodiment can be started up from the standby mode in a short time.

A description will now be given, with reference to FIG. 10, of an operation for measuring an adhesion torque which is needed to start the spindle motor 38 when the magnetic head is adhered onto the magnetic head due to the magnetic head being in contact with the magnetic disk for a long time during the standby mode.

A disk enclosure of the magnetic disk apparatus 31 is subject to an adhesion torque measuring test before it is assembled into a final product. That is, the disk enclosure is placed in an environment in which the temperature and humidity are maintained at predetermined values after the magnetic head is contacted with the magnetic disk to let the magnetic head adhere to the magnetic disk. This condition is established by setting the magnetic disk apparatus 31 in the standby mode mentioned above.

Figure 10:
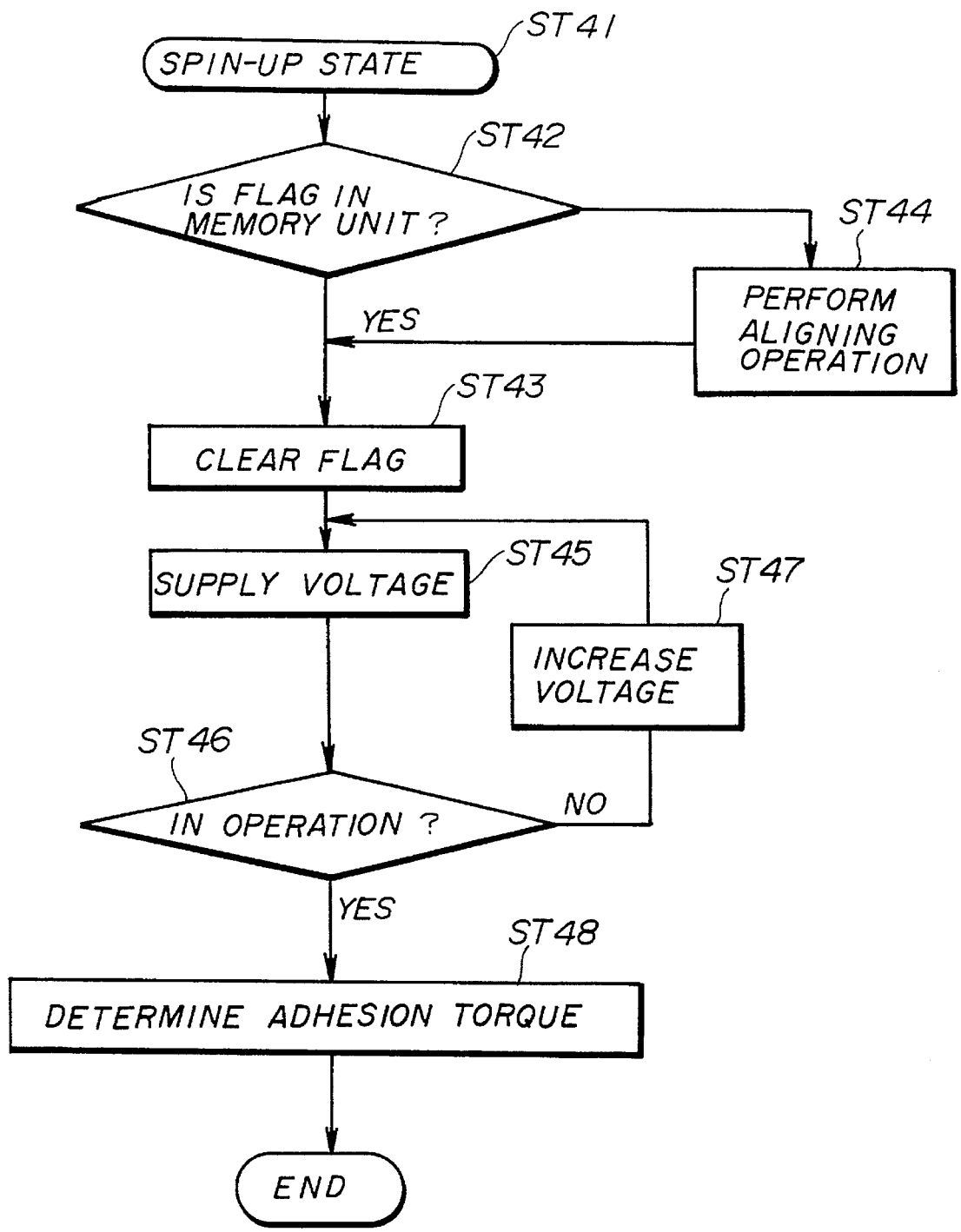
FIG. 10 is a flow chart of an operation for measuring an adhesion torque.

More specifically, the spin-on command is supplied from the CPU 32 to the MPU 34, and thus the MPU 34 is set, in ST41, in a spin-up state where it is determined, in ST42 in FIG. 10, whether or not the flag indicating that the aligning operation has been performed is written-in the memory unit 36. If it is determined that the flag is written in the memory unit 36, which condition indicates that the aligning operation has been performed, the flag is cleared in ST43. If it is determined that the flag is not written in the memory unit 36, the routine proceeds to ST44 where the aligning operation is performed, and then the routine proceeds to ST43.

After the flag is cleared in ST43, the disk enclosure is placed in the above-mentioned environment to let the magnetic head adhere to the magnetic disk. After a predetermined period has elapsed, the magnetic disk apparatus 31 is subject to the operation for measuring the adhesion torque.

After the predetermined period has elapsed, the routine proceeds to ST45 in which a predetermined acceleration signal is supplied to the MSC 37 so as to supply a voltage having a predetermined level to the spindle motor 38. This voltage is far below the rated voltage of the spindle motor 38, and thus the spindle motor 38 will not start at this voltage.

The routine then proceeds to ST46 where it is determined whether or not the spindle motor 38 is in operation. If it is determined that the spindle motor 38 is not in operation, the routine proceeds to ST47 where the voltage is increased by a predetermined small amount, and then the routine returns to ST45 to repeat ST45 and ST46. That is, voltage supplied to the spindle motor 38 is gradually and stepwisely increased until the motor begins to rotate. A relationship between the voltage supplied to the spindle motor 38 and the adhesive torque was obtained beforehand, and thus the adhesion torque of the particular disk apparatus can be obtained by referring to the relationship.

If it is determined, in ST46, that the spindle motor starts to rotate, the adhesive torque is determined, in ST48, by referring to the voltage supplied to the spindle motor 38, that is, by referring to a relationship between the voltage supplied to the spindle motor 38 and the start-up torque of the spindle motor 38 when no adhesion torque is applied to the spindle motor, which relationship was obtained beforehand.

In the above-mentioned operation, since the aligning operation has been performed before the operation for measuring the adhesion torque by supplying voltage to the spindle motor 38 in ST45, the spindle motor 38 never rotates in a reverse direction as in the prior art, and thus an exact adhesion torque can be measured.

The present invention is not limited to the specifically disclosed embodiments, and variations and modifications may be made without departing from the scope of the present invention.

What is claimed is:

1. A method of controlling start-up of a brushless and sensorless motor used in a disk apparatus, the motor being used for rotating a disk on which information is recorded, the motor having no sensor for sensing an angular position of a rotor relative to a stator of the motor, the method comprising the steps of:

a) stopping said motor being operated at a steady rotational speed by supplying a stop command;

b) performing an aligning operation immediately after said motor is stopped, the aligning operation being performed to rotate said rotor to a predetermined angular position relative to said stator of said motor; and c) operating said motor at a steady speed by a synchronization control when an operation of said motor is started by supplying a start command.

2. The method as claimed in claim 1, further comprising the steps of:

d) storing in a memory, when the step b) is performed, information representing whether or not the aligning operation has been performed; and e) performing the aligning operation immediately before performing the step c) when said information stored in said memory represents that the aligning operation has not been performed.

3. The method as claimed in claim 2, wherein said memory comprises a non-volatile memory.

4. The method as claimed in claim 1, wherein the step a) is performed when no request for accessing to said disk apparatus is made during a predetermined period.

5. The method as claimed in claim 1, wherein said motor is operated at the steady speed by performing a control in accordance with a detection of back electromotive forces detected in a plurality of phase coils provided in said stator of said motor.

6. A method of controlling start-up of motor in a magnetic disk apparatus when an adhesion torque is measured in advance, the motor being used for rotating a magnetic disk on which information is recorded, the disk apparatus having a head for recording/reproducing the information to/from the magnetic disk, wherein the motor start-up torque is increased by the adhesion torque generated due to adhesion of the head to the disk, the method comprising the steps of:

stopping said motor by supplying a stop command thereby causing said head to contact said disk;

performing an aligning operation immediately after said motor is stopped, wherein the aligning operation is performed to rotate a rotor of said motor to a predetermined angular position relative to a stator of said motor;

stepwisely applying a voltage to said motor until said motor starts to rotate; and determining the adhesion torque in accordance with a relationship between a voltage supplied to said motor and the start-up torque obtained in advance.

* * * * *